(12) United States Patent
Krauss

(10) Patent No.: US 7,946,001 B2
(45) Date of Patent: May 24, 2011

(54) HOSE CLAMP

(75) Inventor: Mathias Krauss, Nidderau (DE)

(73) Assignee: Norma Germany GmbH, Maintal (DE)

( * ) Notice: Subject to any disclaimer, the term of this patent is extended or adjusted under 35 U.S.C. 154(b) by 838 days.

(21) Appl. No.: 11/974,170

(22) Filed: Oct. 10, 2007

(65) Prior Publication Data

US 2008/0098572 A1 May 1, 2008

(30) Foreign Application Priority Data

Oct. 12, 2006 (DE) .................. 10 2006 048 344

(51) Int. Cl.
*F16L 33/02* (2006.01)
*F16L 33/00* (2006.01)

(52) U.S. Cl. .............. 24/19; 24/279; 24/280; 24/282; 24/284; 24/274 R; 285/23

(58) Field of Classification Search ............ 24/274 R, 24/19, 279, 280, 282, 284; 285/23
See application file for complete search history.

(56) References Cited

U.S. PATENT DOCUMENTS

| | | | |
|---|---|---|---|
| 3,365,218 A | 1/1968 | Denyes | |
| 3,407,448 A | 10/1968 | Tetzlaff et al. | |
| 3,454,996 A * | 7/1969 | Tetzlaff et al. | 24/283 |
| 3,477,106 A * | 11/1969 | Tetzlaff et al. | 24/279 |
| 6,942,253 B2 * | 9/2005 | Bowater | 285/23 |

FOREIGN PATENT DOCUMENTS

| | | |
|---|---|---|
| DE | 4127017 | 4/1992 |
| DE | 10324236 A1 * | 8/2004 |
| EP | 1564471 | 8/2005 |
| FR | 2 887 321 | 12/2006 |
| JP | 2006506585 | 2/2006 |
| WO | 2004044474 | 5/2004 |

* cited by examiner

*Primary Examiner* — Robert J Sandy
(74) *Attorney, Agent, or Firm* — Lucas & Mercanti, LLP; Klaus P. Stoffel

(57) ABSTRACT

A hose clamp includes a clamping band, a clamping device and a positioning arrangement, wherein the positioning arrangement has at least one positioner with a base and a claw for being pressed into a hose wall. The claw has a portion protruding inwardly from the base in a pressing direction, wherein the claw has an end which forms with the inwardly protruding section an obtuse angle ($\alpha$).

11 Claims, 1 Drawing Sheet

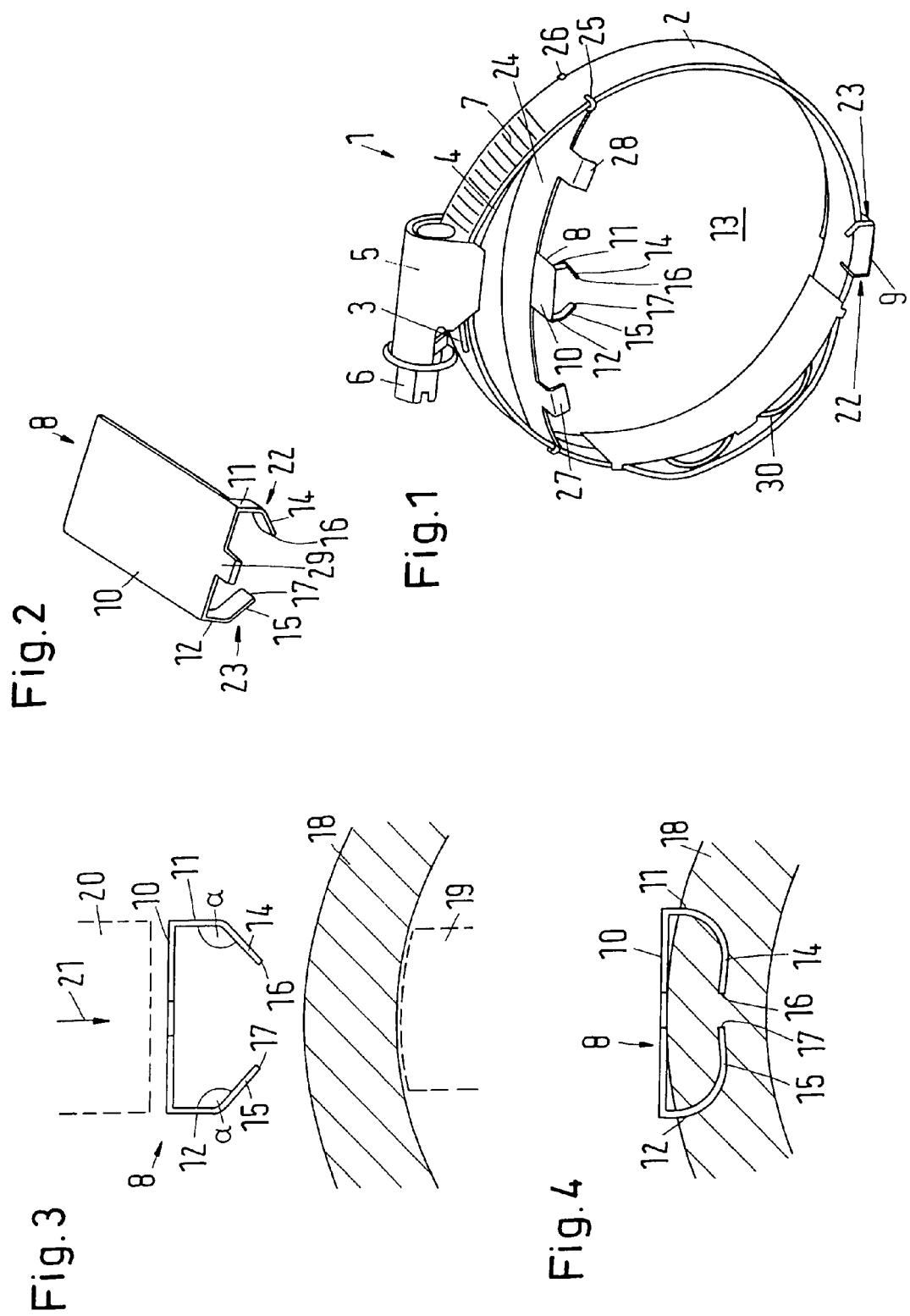

HOSE CLAMP

BACKGROUND OF THE INVENTION

1. Field of the Invention

The present invention relates to a hose clamp with a clamping band, a clamping device and a positioning arrangement which includes at least one positioner or positioning means with a base and a claw which can be pressed into a hose wall.

2. Description of the Related Art

A hose clamp has the purpose of tightly clamping a hose onto a connection piece. For this purpose, the hose clamp is placed in the area of the connection piece around the hose and the clamping devices is actuated in order to hold the clamping band together around the circumference of the hose. As a result, the hose is held in a clamping manner on the connection piece.

In order to be able to actuate the clamping device the person using the tool must place the tool against the clamping device. For this reason, many users of hose clamps require that the hose clamp is preassembled on the hose, so that it has at least in the circumferential direction a predetermined in orientation relative to the hose.

Therefore, it was proposed in WO 2004/044474 A1, which discloses a hose clamp of the above-described type, to fasten a positioner on the clamping band, wherein the positioner has two claws which are attached to a base. Each claw has a section which extends essentially perpendicularly of the base and protrudes outwardly, i.e., away form the hose. This section is followed by an end which is bent at an angle. For fastening the hose clamped to the hose, a tool is required which presses with a die on the base in the direction toward the hose. The hose is held from the inside by means of a support. When the hose clamp is held in this manner, two clamping jaws are used for acting laterally, i.e., in circumferential direction of the hose, in order to move the claws toward each other. As a result, the claws dig into the wall of the hose, so that the hose clamp is anchored on the hose.

Such a type of fastening requires a complicated mechanism.

SUMMARY OF THE INVENTION

Therefore, it is the primary object of the present invention to simplify the preassembly of the hose clamp on the hose. In accordance with the present invention, in a hose clamp of the above-described type the above object is met by providing the claw with a portion which protrudes inwardly from the base in a pressing direction, wherein the claw has an end which includes an obtuse angle with the inwardly protruding portion.

As a result of the configuration of the claw according to the present invention, the preassembly of the hose clamp on the hose is significantly simplified. It is essentially only required that a pressure be applied to the piece which is directed radially in relation to the hose. As a result of the pressure, the end of the claw, which extends at an obtuse angle relative to the inwardly protruding portion which is connected to the base, penetrates into the wall of the hose. This penetration occurs as a result of the arrangement at an angle of the end of the claw also initially radially or parallel to the radial direction. However, after a very short penetration depth, the end is deflected toward the side. Since the end of the portion which is connected to the base cannot follow this deflection, the claw is in its totality bent. When the end of the claw further penetrates into the wall of the hose, the claw is bent between the end of the fastening to the base in such a way that it eventually has the shape of half a paper clip. In most conventional thicknesses of the hose wall, the end of the claw does not even make contact with the inner side of the wall because it previously has been displaced to a sufficient extent in circumferential direction.

In accordance with a preferred feature, the end of the claw is arranged at an end portion which is contiguous with the inwardly directed portion. Consequently, the claw is in principle formed of two straight portions, namely the end portion and the portion attached to the base. When the claw has been pressed into the hose wall, then these two portions have been deformed to such an extent that they together form about a quarter circle. Of course, additional straight portions can be provided adjacent this quarter circle.

In accordance with another preferred feature, the inwardly directed portion extends at a right angle to the base. This makes it possible to transmit the force which is exerted onto the base to the claw in the best possible manner. The portion attached to the base maintains in the area of the base this alignment at a right angle relative to the base. The claw is only deformed further away toward the end thereof. The term "at a right angle" is not to be understood in this case in the mathematically exact sense. However, the portion connected to the base should extend approximately parallel to the pressing direction. The angle preferably has a magnitude in the range of 110° to 160°. Particularly preferred are angles in the range of 120° to 150°. Pressing the claw into the wall of a hose works particularly well if the angle is about 135°. In that case, the end of the claw is displaced at least to such an extent in circumferential direction within the wall of the hose as it penetrates into the wall. Preferably, two claws emanate from the base, wherein the ends of the claws are directed toward each other. This results in a force equilibrium in the circumferential direction, i.e., it is no longer necessary to secure the base against a lateral displacement in the circumferential direction. When the two claws have been finally bent, the consecution has a shape which is similar to a whole paper clip.

In accordance with the preferred feature, the obtuse angles of both claws are equal. The smaller the difference between the two angles, the better is the equilibrium of the forces in circumferential direction. However, a mathematically exact equality is also not necessary in this case.

Preferably, the base has a smooth outer side. This makes it easier to apply a tool. In addition, the smooth surface ensures that there are no elements which protrude radially outwardly and which would later be in the way of a person assembling the hose clamp. In the assembled state there are also no perturbing elements in the area of the positioner.

The base preferably protrudes at least with a section axially beyond the clamp band. Consequently, the claws can be pressed into the hose wall outside of a region in which the clamping force of the clamping band acts. This prevents the end of the clamp from being pressed completely through the hose wall as a result of the clamping force.

In accordance with another preferred feature, the base protrudes axially beyond the claw at least over a portion of the base. This makes it easier to position the hose clamp in such a way that the claw is arranged with a predetermined distance from the end face of the hose. It is only necessary to have the base flush with the end face of the hose. The positioner is preferably arranged at a spring bridge whose ends are connected to the clamp band. The spring bridge provides the advantage that the clamping band may have in the area of the positioner a certain distance from the positioner when the clamp band is not yet tensioned. When disassembling the hose, i.e., when releasing the clamp, the spring bridge has the advantage that it spreads apart the clamping band when the clamping device is released.

In accordance with another advantageous feature, the spring bridge is movably connected to the clamping band. This is at least true for one end of the spring bridge. As a result, the spring bridge does not interfere with clamping the clamping band.

It is preferred in this connection that this spring bridge is arranged in the area of the clamping device. The spring bridge serves another purpose. It prevents an end of the clamping band and/or the clamping device from contacting the circumference of the hose with friction, when the hose clamp is tensioned. The movement which takes place during tensioning of the hose clamp between parts of the hose clamp takes place practically exclusively on the outer side of the spring bridge.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a perspective view of a hose clamp with two positioners;

FIG. 2 is a perspective view of another embodiment of a positioner;

FIG. 3 is an exploded view of the positioner prior to insertion into a hose wall; and FIG. 4 shows the positioner after being inserted into the hose wall.

DETAILED DESCRIPTION OF THE INVENTION

As illustrated in the drawing, the hose clamp 1 has a clamp band 2 which is bent into a circular shape, so that an outer end 3 is located above an inner end 4. The two ends are connected by means of a clamping device 5. The clamping device 5 includes a clamping screw 6 which meshes with a threaded embossment 7. When the clamping screw is tightened, the two ends 3, 4 of the clamping band 2 are moved relative toward each other in the circumferential direction of the hose clamp 1, so that the inner diameter of the hose clamp 1 is reduced.

The purpose of this type of hose clamp 1 is to clamp a hose, not shown, onto a connection piece. The hose clamp 1 is placed on the hose. The hose is then pushed onto the connection piece and the hose clamp 1 is tensioned. It is advantageous in this connection if the clamping device 5 is placed on the hose in a different position and is held in this position, so that a person can apply a tool to the clamping screw 6.

For ensuring this positioning, the hose clamp 1 illustrated in FIG. 1 has two positioners 8, 9 which are described in more detail in connection with FIGS. 2 to 4.

The positioner 8, and the positioner 9 which is in principle of the same construction, has a base 10 from which two portions 11, 12 protrude approximately at a right angle. The portions 11, 12 are directed into the interior of the space 13 surrounded by the clamping band 2. Each portion 11, 12 is followed by an end portion 14, 15, wherein the end portions 14, include an angle α with the portions 11, 12 which has a magnitude of about 135°. Accordingly the angle α is an obtuse angle. The two end portions 14, 15 are directed toward each other. The end portions 14, 15 have ends 16, 17. If necessary, these ends 16, 17 may be pointy. As seen in FIG. 3, for fastening the hose clamp onto a wall 18 of a hose, the wall 18 is supported from the inside by means of an anvil 19 at that location where the positioner 8 is to be placed in the wall 18. The positioner 8 is then placed with the ends 16, 17 on the wall 18 and is pressed by means of a die 20 onto an anvil 19 in a pressing direction symbolized by an arrow 21. The ends 16, 17 penetrate into the wall 18 as a result. Since the end portions 14, 15 extend at an angle relative to the pressing direction 21, the application of force by the positioner 8 as a result of the die 21 has the result that the ends 16, 17 not only move parallel to the pressing direction 21, but also are displaced in the circumferential direction through the material of the wall 18. The more the base 10 is moved toward the circumference of the wall 18, the more the ends 16, 17 are moved in the circumferential direction, so that the "legs" of the positioner 8, which prior to insertion as shown in FIG. 3 are formed by two straight sections 11, 14 and 12, 15, now have an arch shape. The positioner 8 is not seated in the manner of a paper clip in the wall 18 of the hose while the ends 16, 17 do not protrude inwardly out of the hose.

The positioner 9 is fastened directly to the clamping band 2, for example, by welding, soldering, gluing or by a clinched or embossed connection. The positioner 9 is fastened to the clamping band 2 in such a way that its claws 22, 23, i.e., the two portions 11, 14 and 12, 15 which extend at an angle relative to each other, have an axial distance from the clamping band 2. This makes it possible to have the die 20 act on the base 10 axially outside of the clamping band 2.

The positioner 8 is arranged at a spring bridge 24 whose two ends are movably attached to the clamping band 2. For this purpose, the spring bridge has at each end thereof clamps 25, 26 which are bent around the clamping band 2. The positioner 8 can also be constructed as a single piece with the spring bridge 24.

On both sides in circumferential direction of the positioner 8, the spring bridge 24 has a stop 27, 28 each of which rests against the end face of the hose 18 in the case of a preassembled hose clamp 1.

The spring bridge 24 is arranged where the ends 3,4 of the clamping band 2 overlap, i.e. where the clamping device 5 is positioned. Accordingly, the spring bridge 24 prevents the inner end 4 or the clamping device 5 from sliding directly onto the circumference of the wall 18 when the hose clamp is tensioned. Rather, this movement takes place on the outer side of the spring bridge 24.

The positioner 8 illustrated in FIG. 2 is slightly modified relative to the positioner 8 as shown in FIG. 1 because it has a projection 29 which protrudes axially beyond the claws 22, 23.

A hose clamp 1 which is equipped with such a positioner 8 can be positioned in a simple manner in the axial direction on the wall 18, so that the protrusion 29 ends at the end face of the wall 18. The two positioners 8, 9 are arranged essentially diametrically opposite of each other. The positioner 9 is fixedly attached to the clamping band 2 while the positioner 8 is mounted in a "floating" manner on the clamping band 2. This makes it possible to connect the positioners 8, 9 tightly to the wall 18 without negatively influencing the tensioning possibilities for the hose clamp 1.

The hose clamp 1 additionally has on its inner side a spring arrangement 30. This spring arrangement 30 makes it possible to maintain the tension of the hose clamp 1 even in the case of diameter changes which may be due, for example, to thermal influences.

While specific embodiments of the invention have been shown and described in detail to illustrate the inventive principles, it will be understood that the invention may be embodied otherwise without departing from such principles.

I claim:

1. A hose clamp comprising a clamping band, a clamping device and a positioning arrangement, the positioning arrangement comprising at least one positioner having a base and a claw adapted for being pressed into a hose wall, wherein the claw has a portion protruding inwardly from the base in a pressing direction, wherein the claw has a radially parallel end portion directed into a space surrounded by the clamping band and having an end which forms with the inwardly protruding portion an obtuse angle (a).

2. The hose clamp according to claim 1, wherein the end of the claw is arranged at an end portion located immediately adjacent the inwardly protruding section.

3. The hose clamp according to claim 1, wherein the inwardly protruding section extends at a right angle relative to the base.

4. The hose clamp according to claim 1, wherein the angle (a) has a magnitude ranging from 110° to 160°.

5. The hose clamp according to claim 1, wherein two claws extend from the base, wherein the ends of the claws are directed toward each other.

6. The hose clamp according to claim 5, wherein the obtuse angle (a) of both claws has the same magnitude.

7. The hose clamp according to claim 1, wherein at least a portion of the base protrudes axially beyond the clamping band.

8. The hose clamp according to claim 1, wherein at least a portion of the base protrudes axially beyond the claw.

9. The hose clamp according to claim 1, wherein the positioner is arranged on a spring bridge whose ends are connected to the clamping band.

10. The hose clamp according to claim 9, wherein the spring bridge is movably connected to the clamping band.

11. The hose clamp according to claim 9, wherein the spring bridge is arranged in an area of the clamping device.

* * * * *